United States Patent Office 3,767,772
Patented Oct. 23, 1973

3,767,772
PROCESS FOR PREPARING NITROGEN MONOXIDE
John W. Geus and Adriaan P. P. Nobel, Geleen, Joseph J. F. Scholten, Sittard, and Wilhelmus G. Scheijen, Urmond, Netherlands, assignors to Stamicarbon N.V., Heerlen, Netherlands
No Drawing. Filed Oct. 18, 1971, Ser. No. 190,366
Claims priority, application Netherlands, Oct. 23, 1970, 7015516
Int. Cl. C01b 21/26
U.S. Cl. 423—404
3 Claims

ABSTRACT OF THE DISCLOSURE

An improved process for the preparation of nitrogen monoxide from ammonia and molecular oxygen at an elevated temperature in the presence of a catalyst system containing cobalt oxide is disclosed wherein the efficiency of the catalyst is periodically restored by intermittently decreasing the ammonia content of the gas mixture supplied to the reactor by from one to ten percent by volume, each intermittent reduction lasting from about one to about ten minutes.

---

The present invention relates to a process for preparing nitrogen monoxide by contacting ammonia and molecular oxygen at an elevated temperature in the presence of a catalyst system containing cobalt oxide.

In the preparation of nitric acid starting from nitrogen monoxide, the nitrogen monoxide can be obtained by burning ammonia in molecular oxygen from an oxygen-containing gas, more particularly in oxygen from air, in the presence of a catalyst. At present, platinum/rhodium gauzes are still frequently used as the catalyst in the production of nitrogen monoxide, practically to the exclusion of others. However, recrystallization of the platinum results in platinum losses and deterioration of the mechanical strength of the gauzes, requiring frequent catalyst gauze replacement. This, of course, is disadvantageous not only because of the high capital outlay involved in replacing platinum/rhodium gauzes, but also because of production losses.

It has long been known that the reaction of ammonia and molecular oxygen to form nitrogen monoxide is also catalyzed by cobalt oxide. However, investigation into this matter has shown that only cobalt oxide in the form of $Co_3O_4$ induces the desired reaction to nitrogen monoxide. When cobalt oxide is present as CoO, nitrogen and nitrous oxide evolve, appreciably decreasing the conversion to nitrogen monoxide. Therefore, an acceptable nitrogen monoxide yield from the conversion of ammonia and molecular oxygen at an elevated temperature in the presence of a catalyst system containing an oxide of cobalt, is conditioned on the catalyst system retaining the $Co_3O_4$ structure.

It has been found that a low efficiency in the conversion of ammonia to nitrogen monoxide is invariably attended by the presence of CoO with the $Co_3O_4$ catalyst, which CoO may effectively cover the $Co_3O_4$ like a cloak.

From "Gmelins Handduch der anorganischen Chemie," 8th edition, 1932, vol. A, System No. 58, it is known that the temperature range in which CoO is formed from $Co_3O_4$ lies above 900° C., and in "Zeitschrift fur Anorganische und Allgemeine Chemie," 1963, vol. 323, page 92, this temperature of the formation of CoO from $Co_3O_4$ is identified from a paper by Sazaki to be in excess of 980° C.

This conversion of $Co_3O_4$ to CoO, which is detrimental to the efficiency of the catalytic reaction, has been examined in greater detail by radiography, using a high temperature camera. Accordingly, a sample of $Co_3O_4$ was placed in an inert atmosphere containing 10% by volume oxygen and studied as it was heated. It was found that as the temperature increased, the $Co_3O_4$ completely changed to CoO at about 890 to 900° C. When this sample was cooled in the same atmosphere, however, the CoO did not oxidize to $Co_3O_4$ until a temperature 840 to 850° C. was reached. Under these conditions, therefore, it can be concluded that the thermodynamic equilibrium tends toward the $Co_3O_4$ form at 840° C., and below.

It is therefore preferable, when $Co_3O_4$ is used as a catalyst in the preparation of nitrogen monoxide from ammonia and molecular oxygen, that the reaction be run at a catalyst temperature of at most 850° C., more preferably 675 to 750° C. But even when this preparation of nitrogen monoxide is conducted at this low temperature of 675 to 750° C., the activity of the catalyst nevertheless slowly decreases. For example, a catalyst initially resulting in a reaction efficiency of 96% may, after a few weeks of continuous operation, decrease to 75% or less. In view of the position of the equilibrium between $Co_3O_4$ and CoO at these low temperatures, this decrease in activity cannot be attributed to the formation of CoO, as can be done when working at a temperature of 850° C. and higher. The decrease in activity at the lower reaction temperatures has probably to be attributed to the formation of at the moment not understood compounds or configurations of cobalt and oxygen.

It has now been discovered that the efficiency of the formation of nitrogen monoxide from ammonia and molecular oxygen in the presence of a catalyst system containing $Co_3O_4$ can be rapidly restored by reducing, intermittently, the ammonia content of the supplied gas mixture to the reactor containing ammonia and molecular oxygen. As a rule, it is sufficient if the ammonia content of the supplied gas mixture is reduced for only from 1 to 10 minutes, preferably, 2 to 5 minutes. Reducing the ammonia content of the supplied gas mixture need not detrimentally effect the normal progress of the process, since the overall production is only reduced for a short time. Moreover, if several reactors are operating in parallel, the ammonia supply can be reduced in only one reactor at a time.

Dependent upon the initial ammonia content of the supplied gas mixture, the catalyst may be sufficiently restored by intermittently reducing this ammonia content by from one to ten percent by volume, preferably by about five percent by volume. In this manner, the nitrogen monoxide formation efficiency of a catalyst which has decreased to less than 90% can be restored in a very short time to 95% or more.

The invention will be further elucidated by means of the following example:

A tubular reactor was filled with a catalyst mass consisting of $Co_3O_4$ in the form of particles having a size of 1 to 2 mm. A gas mixture consisting of 1 part by volume ammonia and 9 parts by volume air was passed through the catalyst mass at a space velocity of 100,000 liters of gas per liter of catalyst per hour. The temperature of the catalyst bed was 750° C.

Initially, the nitrogen monoxide formation efficiency of the catalyst was 96%, but after two weeks of continuous operation has passed, this efficiency dropped to 75%.

The ammonia supply to the reactor was then stopped completely. After 2 minutes, the ammonia supply was resumed and the nitrogen monoxide formation efficiency of the catalyst was found to have increased to 87%.

The above nitrogen monoxide reaction was again run under the same conditions until the nitrogen monoxide formation efficiency declined to 75%. This time the ammonia content of the supplied gas mixture was reduced by one-half for a 5-minute period. After the original ammonia supply was resumed, the nitrogen monoxide formation efficiency of the catalyst was found to have increased to 96%. In another run the nitrogen monoxide formation was performed under the same conditions as described above, until the efficiency has dropped to 80%, which point was reached after continuous operation during ten days. Then the ammonia content of the reaction gases was lowered by 8% during 10 minutes. After that time, the ammonia supply was resumed and the nitrogen monoxide formation efficiency of the catalyst was found to be restored to 90%.

The frequency of the intermittent reduction of the ammonia content of the reaction gases may be varied within wide limits, e.g. from 10 days to 3 weeks. For a smooth continuous performance of the process according to the invention, the ammonia content of the reaction gases may be reduced one time every ten days. The restoration of the cobalt catalyst can be repeated indefinitely.

What is claimed is:

1. In a process for the preparation of nitrogen monoxide wherein a supplied gas mixture of ammonia and molecular oxygen is reacted at an elevated temperature in the presence of a catalyst system containing cobalt oxide to form said nitrogen monoxide, the improvement consisting essentially in intermittently reducing the ammonia content of said supplied gas mixture by from one to ten percent by volume calculated on the amount of ammonia originally present, each of said intermittent reductions lasting from about one to ten minutes, whereby the nitrogen monoxide formation efficiency of said catalyst system is periodically restored.

2. The process of claim 1 wherein the duration of reduced ammonia content of said supply gas mixture at each of said intermittent reductions is about two to five minutes.

3. The process of claim 1 wherein the ammonia content of said supplied gas mixture is intermittently reduced by about five percent by volume.

References Cited
UNITED STATES PATENTS

| | | | |
|---|---|---|---|
| 2,222,884 | 11/1940 | Stowe | 423—404 X |
| 2,626,246 | 1/1953 | Naragon et al. | 252—416 |
| 2,017,683 | 10/1935 | Crittenden | 423—404 X |

GEORGE O. PETERS, Primary Examiner

U.S. Cl. X.R.

423—405; 252—419